United States Patent [19]

Santa Maria et al.

[11] Patent Number: 5,642,098
[45] Date of Patent: Jun. 24, 1997

[54] CAPACITIVE OIL WATER EMULSION SENSOR SYSTEM

[75] Inventors: Allen F. Santa Maria, Staten Island, N.Y.; Pranab K. Banerjee, West Kingston, R.I.; James F. Vincent, Jr., Cranston, R.I.

[73] Assignee: OEMS Corporation, Providence, R.I.

[21] Appl. No.: 634,272

[22] Filed: Apr. 18, 1996

[51] Int. Cl.$^6$ ................................................. B60Q 1/00
[52] U.S. Cl. ................. 340/618; 340/620; 73/304 C; 324/662; 324/664; 324/665; 324/671
[58] Field of Search ......................... 340/618, 439, 340/620, 658, 660; 73/40, 304 C; 324/439, 442, 446, 634, 662, 664, 665, 667, 671

[56] References Cited

U.S. PATENT DOCUMENTS

| | | | |
|---|---|---|---|
| 3,675,121 | 7/1972 | Thompson | 324/664 |
| 3,768,006 | 10/1973 | Mueller | 324/665 |
| 3,774,237 | 11/1973 | Hardway, Jr. | 324/663 |
| 3,778,706 | 12/1973 | Thompson | 324/668 |
| 4,018,683 | 4/1977 | Walters et al. | 210/739 |
| 4,112,318 | 9/1978 | Hamelink | 340/620 |
| 4,137,494 | 1/1979 | Malley et al. | 324/450 |
| 4,213,340 | 7/1980 | Cheng | 340/620 |
| 4,222,267 | 9/1980 | Aldrich | 340/620 |
| 4,389,889 | 6/1983 | Larson | 340/450.2 |
| 4,394,573 | 7/1983 | Correa et al. | 250/253 |
| 4,434,364 | 2/1984 | Correa et al. | 250/253 |
| 4,503,383 | 3/1985 | Agar et al. | 324/663 |
| 4,571,543 | 2/1986 | Raymond et al. | 324/425 |
| 4,594,893 | 6/1986 | Lombard et al. | 73/304 C |
| 4,638,305 | 1/1987 | Sutton | 340/620 |
| 4,653,445 | 3/1987 | Book et al. | 123/198 DC |
| 4,674,879 | 6/1987 | Gregorig et al. | 356/301 |
| 4,857,829 | 8/1989 | Sagne et al. | 324/698 |
| 5,051,921 | 9/1991 | Paglione | 364/509 |
| 5,315,884 | 5/1994 | Kronberg | 73/862.868 |

*Primary Examiner*—Jeffery Hofsass
*Assistant Examiner*—Davetta Woods
*Attorney, Agent, or Firm*—Salter & Michaelson

[57] ABSTRACT

A sensor system is operable for detecting the presence of water in an oil emulsion inside the lower gear unit of a marine engine, and for providing an alarm signal when the presence of water is detected within the gear unit. The sensor system includes a ring oscillator circuit and a symmetrical array of passive input probes which are disposed in the oil/water emulsion inside the oil chamber. Each of the passive input probes is electrically connected to the ring oscillator circuit wherein the probes function as fixed capacitors for measuring the electrical characteristics of the emulsion. When a voltage is applied to the oscillator circuit, the oscillator circuit generates an oscillating signal that circulates at a frequency which varies according to the dielectric-properties of the liquid emulsion. When water is introduced into the chamber, the water is emulsified with the oil thereby changing the electrical characteristics of the oil. The sensor system further includes a frequency conversion circuit for sensing the frequency of the oscillating signal and linearly converting the frequency to a corresponding voltage signal. The output voltage signal is then compared to a predetermined steady state voltage value by a comparator circuit which generates an output signal when the voltage signal drops below the steady state voltage value. External visual and audible alarm devices provide recognizable alarm signals responsive to the output signal thereby reducing avoidable expense and increasing safety of the engine system.

14 Claims, 3 Drawing Sheets

CAPACITIVE OIL WATER EMULSION SENSOR SYSTEM

BACKGROUND AND SUMMARY OF THE INVENTION

The instant invention relates to sensor systems for sensing emulsions of oil and water, and more particularly to a sensor system including a sensor assembly for detecting the presence of water in an oil emulsion, and further including an alarm assembly for signaling when the presence of water is detected in the oil emulsion.

In outboard and/or inboard marine engines, the portion of the engine that houses the propeller extends below the surface of the water so that the propeller is situated beneath the surface of the water for propelling the boat. Within the portion of the engine housing which extends beneath the water, there is located an internal chamber in which the gearing elements that transfer power from the engine drive shaft to the propeller shaft are located. This internal chamber is filled with oil which lubricates the gearing elements during rotation thereof. The position of the chamber below the surface of the water allows cooling of the oil by heat conduction through the housing walls. However, one particular problem that has been associated with marine engines is the unwanted introduction of water into the internal oil-filled chamber from leaks in the engine housing or failure of a sealing member. The presence of water in the oil compartment reduces the lubricating ability of the oil thus causing excessive wear on the gearing and engine elements. This type of gradual wear on the gearing system often goes unnoticed because the parts are internal, and often leads to failure of the gearing system through a gradual deterioration of the gearing surfaces. In addition, any failure of a seal may cause an influx of water into the oil chamber leading to an eventual and complete failure of the gearing system, and/or seizure of the engine. In either event, the cost to repair and/or replace a marine engine is very expensive.

Despite the not uncommon occurrence of such lower gear unit failures, it has been found that there is a lack in the industry of any effective sensing system which could detect the presence of water within the oil chamber and which also warns the operator that there is water present so that the engine could be shut down before any damage occurs. In response to the stated problem, the instant invention provides a novel and effective sensor system which detects the presence of water in the oil chamber of a marine engine, and which provides an alarm signal to indicate to the boat operator that water is present in the oil chamber.

More specifically, the sensor system comprises a ring oscillator circuit and a symmetrical array of passive input probes which are disposed in the oil inside the oil chamber. Each of the passive input probes is electrically connected to the ring oscillator circuit wherein the probes function as fixed capacitors for measuring the electrical characteristics of the oil emulsion. When a voltage is applied to the oscillator circuit, the oscillator circuit generates an oscillating current that circulates at a frequency which varies according to the dielectric constant of the liquid emulsion. Accordingly, when water is introduced into the oil chamber it is emulsified with the oil and changes the dielectric properties of the oil. The sensor system further includes a frequency conversion circuit for sensing the frequency of the oscillating signal and linearly converting the frequency to a corresponding voltage signal. A frequency divider is utilized to divide the frequency by a factor of 32 to bring the operating frequency into an acceptable range for the frequency to voltage converter. The output voltage signal produced by the frequency to voltage converter is then compared to a predetermined voltage value by a comparator circuit which generates an output signal when the voltage signal exceeds the predetermined voltage value. More specifically, when the voltage signal exceeds the threshold value, the comparator triggers a circuit which permits current to flow through a relay. Actuation of the relay permits current to flow to external visual and audible alarm devices to provide recognizable alarm signals.

Accordingly, among the objects of the instant invention are: the provision of a sensor system which detects the presence of water in an oil chamber of a marine engine; the provision of a sensor system including a ring oscillator circuit and a plurality of passive probes situated within an oil emulsion for sensing changes in the electrical characteristics of the emulsion, i.e. the dielectric constant of the emulsion; the provision of a sensor system including a frequency to voltage converter wherein the frequency of the oscillating signal in the ring oscillator is converted to a corresponding voltage for more accurate comparison of the change in composition of the emulsion; and the provision of a sensor system including a comparator circuit to compare the voltage signal with a predetermined voltage and further including an alarm circuit which emits a recognizable alarm signal when the threshold voltage is exceeded.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
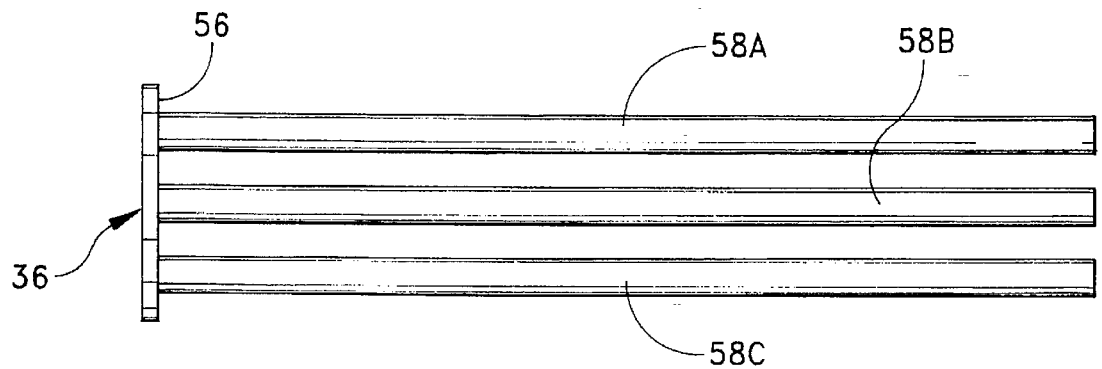
FIG. 1 is a side elevation view of the sensor head of the instant invention.
Figure 2:
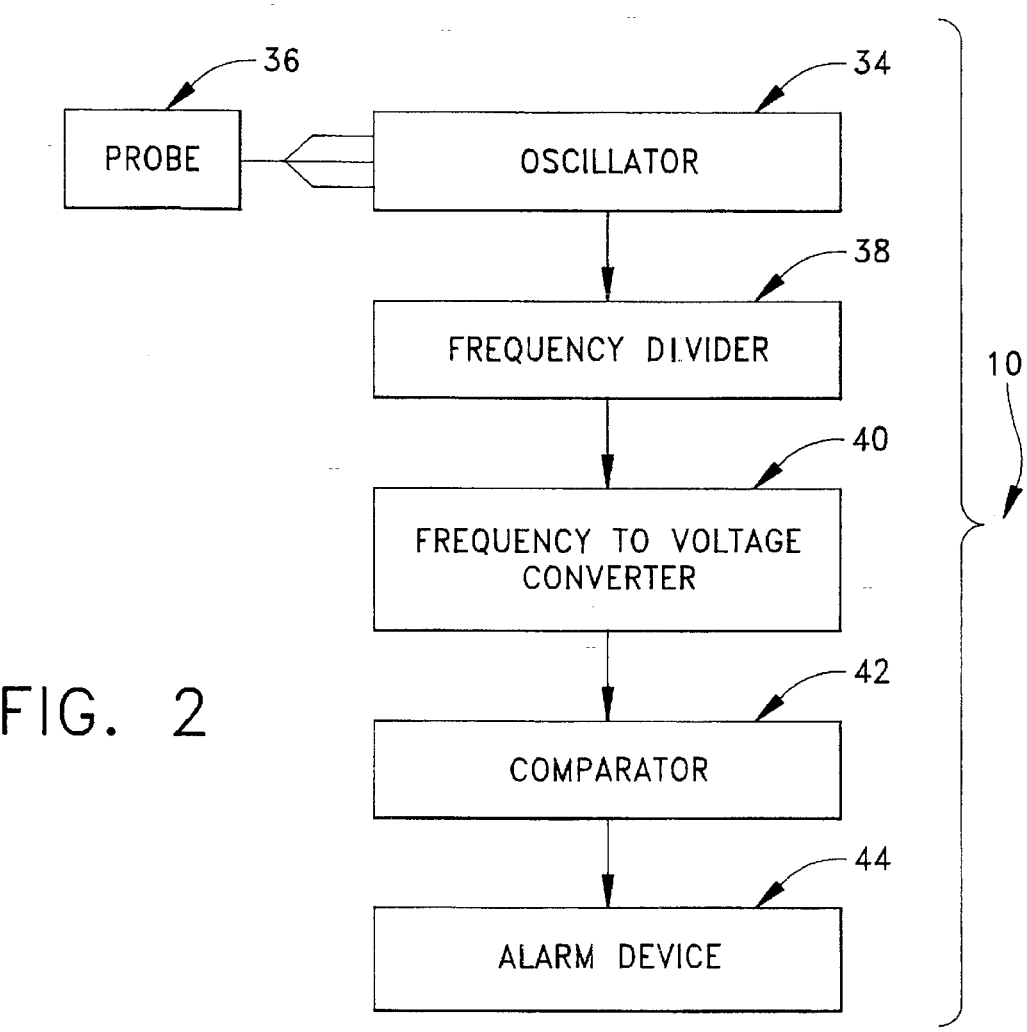
FIG. 2 is a schematic block diagram of the sensor system of the invention.

Referring now to the drawings, the sensor system of the instant invention is illustrated and generally indicated at 10 in FIGS. 1–4. As will hereinafter be more fully described hereinafter, the instant sensor system 10 is particularly adapted for use in detecting the presence of water in an oil emulsion within the lower gear chamber of a marine engine.

Figure 4:
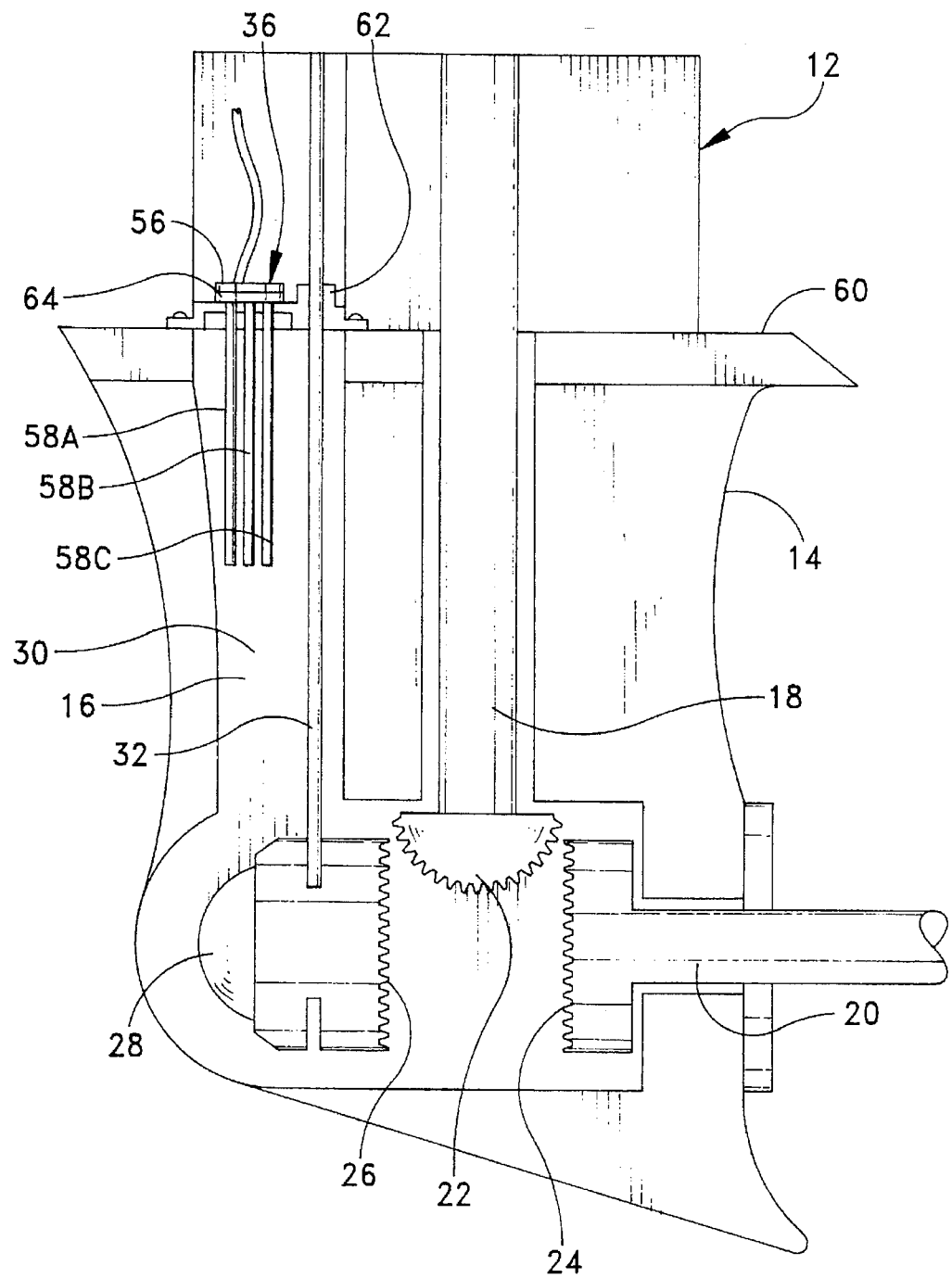
FIG. 4 is a cross-section view of the lower portion of a marine engine.

Referring to FIG. 4, the marine engine generally indicated at 12 includes a lower housing portion 14 which extends below the surface of the water (not shown). The oil chamber 16 is located within this lower housing portion, and located within the oil chamber are the various gearing elements that transfer power from the engine drive shaft 18 to the propeller shaft 20. More specifically, the lower end of the drive shaft 18 includes a gear surface 22 which intermeshes with a gear surface 24 of the propeller shaft 20, and a gear surface 26 of an oil pump 28. The internal chamber 16 is filled with oil 30 to lubricate the gearing elements 22, 24, 26 during rotation thereof. The oil pump 28 is operative for pumping oil 30 upwardly within the lower housing portion 14.

The sensor system 10 comprises a ring oscillator circuit generally indicated at 34, a sensor head generally indicated at 36, a frequency divider circuit generally indicated at 38, a frequency to voltage converter circuit generally indicated at 40, a comparator circuit generally indicated at 42, and an alarm circuit generally indicated at 44.

Before proceeding with the remainder of the detailed description, it is intended that the sensor system 10 be powered by a conventional +12 v battery electrical source 46 of the engine 12. However, it has been found that the power levels of the +12 v battery 46 fluctuate to greatly for use in powering the sensitive electronics of the present sensor system 10. In order to isolate the circuit system from the normal electrical system of the engine 12, the system 10 further includes a voltage regulator generally indicated at 48 which regulates electrical flow, and reduces the voltage from the normal +12 v down to a 5 v source which is more suitable for the present sensor system 10. The voltage regulator 48 is preferably provided by means of a 7805 voltage regulator chip which is well known in the art. The +12 v source 46 is connected to the input of the regulator 48 through a conventional two-way switch 50 to selectively energize the entire system, the output lead of the 7805 chip providing the +5 v source as indicated at 52. To provide a visual indication of power to the system 10, the circuit is provided with a green LED 54 connected to the +5 v source 52. The remaining electronic connections to the 12 v source and the 7805 chip are clearly illustrated in FIG. 3, and therefore these connections will not be described in detail.

The sensor head 36 comprises a body plate 56, and a symmetrical array of passive input probes 58A, 58B, 58C which are configured to be disposed in the oil emulsion 30. More specifically, the array of probes 58A, 58B, 58C preferably comprises three elongate probe elements arranged in a symmetrical pattern at the points of an equilateral triangle. Referring to FIG. 4, the sensor head 36 is preferably mounted on an upper flange 60 of the engine housing 14 so that the probe elements 58 extend downwardly into the interior of the oil chamber 16. The body plate 56 of the sensor head 36 is preferably secured over an opening in a cover plate 62. A gasket 64 is provided between the lower surface of the shaft plate 56 and the upper surface of the cover plate 62 to prevent leakage of oil through the opening. Since the sensor head 36 is subjected to a liquid environment, the sensor head 36 is preferably fabricated from a non-corrosive metal coated with a protective titanium nitride coating. Each of the probe elements 58 is electrically connected to the ring oscillator circuit 34 wherein the probe elements 58 function as fixed passive capacitors for measuring the electrical characteristics, i.e. the dielectric constant, of the oil emulsion 30. It is noted that the sensor head is particularly suited for measuring characteristics of an emulsion because the gearing elements effectively emulsify the mixture of oil and water during operation. When water leaks into the system it does not simply separate from the oil in a normal manner. When a voltage is applied to the oscillator circuit 34, the oscillator circuit 34 generates an oscillating current that circulates at a frequency which varies according to the dielectric constant of the liquid emulsion 30. Although the drawings figures and specification illustrate and describe a set of three elongate cylindrical probes 58, it is to be understood that the probes 58 could take on a variety of different configurations depending on the particular application, and furthermore, it is to be understood that matched pairs of probes arranged in a hexagonal pattern could be connected in parallel and function in the same manner as described.

Figure 3:
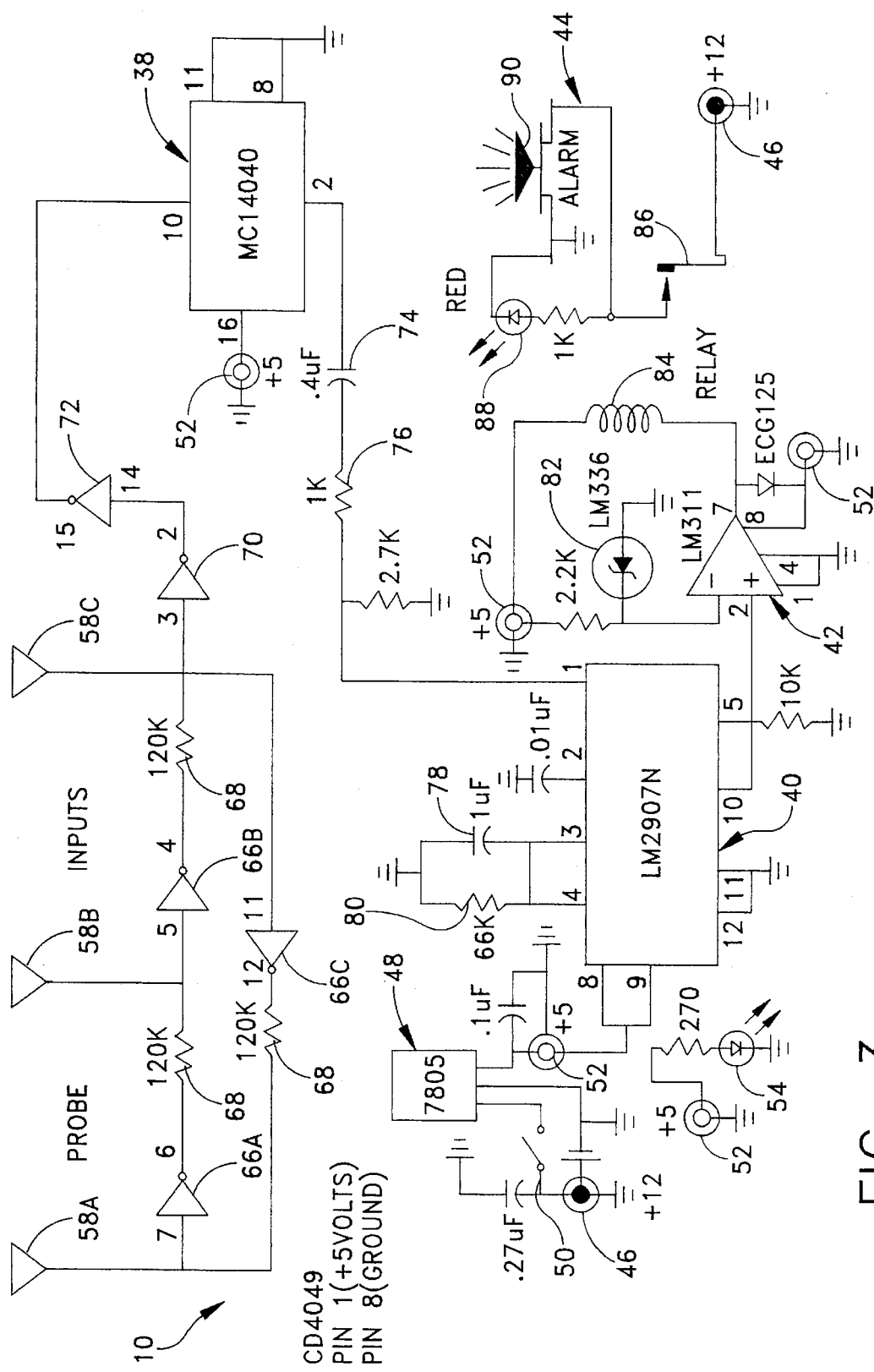
FIG. 3 is a detailed electrical schematic of the sensor system of the invention.

The ring oscillator circuit 34 comprises an odd number of inverting logic gates 66, preferably three gates, which are connected head to head in a continuous ring. The circuit 34 further includes a like number of resistors 68 which are alternated in series with the inverting logic gates 66. The three probe elements 58 are respectively electrically connected to the oscillator circuit 34 as indicated in FIG. 3. The inverting logic gates 66 are preferably provided on a CD4049 type silicon chip wherein the particular input pins of the CD4049 chip are illustrated and defined in FIG. 3. Pin 1 (not shown) of the CD4049 chip is connected to the +5 v source 52, while pin 8 (not shown) of the chip is connected to ground.

The output of the ring oscillator circuit 34 is passed through two additional inverting logic gates 70, 72 before being input into the frequency divider circuit 38. These gates 70, 72 act as buffers to isolate the ring oscillator circuit 34 from the rest of the system 10. The frequency divider circuit 38 is well known in the electronics art, and is preferably provided by means of an MC14040 type chip. The output from the ring oscillator circuit 34 is input into pin 10 of the MC14040 chip and is output through pin 2 as illustrated in FIG. 3. Pin 16 of the MC14040 chip is connected to the +5 v source 52 while pins 8 and 11 are connected to ground. The frequency divider circuit 34 is operative for dividing the frequency of the oscillating signal by a factor of 32 which will bring the output frequency into a suitable range for the frequency to voltage conversion circuit 40.

The output of pin 2 of the frequency divider 38 is passed through a capacitor 74 and a resistor before being input to pin 1 of an LM2907N frequency to voltage conversion chip. The frequency conversion chip LM2907N is operative for sensing the frequency of the oscillating signal and linearly converting the frequency to a corresponding voltage signal. The purpose of linearly converting the frequency to a voltage is to establish a linear parameter which can be accurately compared to a steady state voltage source which will be described hereinafter. The general nature of frequency to voltage conversion circuits 40 is well known in the electronic arts, and will not be described in detail. The various pin connections numbered 2–12 of the LM2907N chip are clearly shown in FIG. 3, and will not be described in detail. It is however, noted that the capacitor and resistor elements 78, 80 connected to pins 3 and 4 of the LM2907N are utilized to fine tune the circuit 40 to the specific application of the sensor, i.e. detect very small changes in dielectric constant. For example, if the length of the probes 58 were changed, or the type of emulsion being sensed were composed of different materials, the specific values of these elements 78, 80 would be varied accordingly, so that a proper voltage reading is output from the chip 40.

The output voltage signal (output pin 5) produced by the frequency to voltage converter 40 is then compared to a predetermined voltage value by the comparator circuit 42, which comprises an LM311 chip. More specifically, the output from pin 5 of the LM2907N is input to pin 2 of the LM311, while a steady state 2.5 v voltage reference is connected to pin 3 of the chip. The steady state 2.5 v voltage source is provided by an LM336 chip 82 connected in parallel with the +5 v voltage source 52. For this particular application, the system 10 has been calibrated so that as long as the water percentage in the oil chamber is less than 10%, the voltage signal produced by the LM2907N will be greater than 2.5 v. When the water percentage exceeds 10% the voltage signal (output pin 5) will decrease below 2.5 v thus triggering the comparator circuit 42.

The comparator circuit 42 is electrically interconnected to a relay element 84 which forms a part of the alarm circuit 44. Referring to FIG. 3, one end of the relay coil 84 is connected to the +5 v source while the second end is connected to pin 7 of the comparator circuit 42. Pin 8 of the comparator 42 is connected to the +5 v source 52; the result of these connections being that there is normally a +5 v source 52 on both sides of the relay coil 84. Accordingly, when the comparator 42 is in a steady state, i.e. untriggered, there is no voltage differential across the relay coil 84, and no current flows through the relay coil 84. However, when the comparator circuit 42 is triggered by a change in the characteristics in the emulsion, the voltage at pin 7 is dropped to a virtual ground state, thus permitting current to flow through the relay coil 84. Actuation of the relay closes an additional switch 86 that permits current to flow from the +12 v source to a visible alarm device, namely a red LED 88, and an audible alarm device, such as a piezoelectric buzzer 90, to provide recognizable alarm signals.

It can therefore be seen that instant invention provides a novel and effective sensor system 10 for sensing the presence of water in the oil chamber 16 of a marine engine 12, and for providing a recognizable alarm signal to an operator of the engine 12 when water is detected within the chamber. In particular, the sensor head 36 and oscillator circuit 34 provide a simple, yet reliable method of detecting the physical composition of the oil/water emulsion 30 within the oil chamber 16, while the frequency to voltage converter 40 and the comparator 42 accurately provide a means for comparing the varying parameter of the composition to a steady state value. Furthermore, the alarm circuit 44 effectively emits an alarm signal when a predetermined water level threshold has been exceeded. The sensor system 10 of the instant invention is thus highly effective for warning the operator to shut down the engine 12 before catastrophic gear damage occurs within the lower gear unit. For these reasons, the instant invention is believed to represent a significant technical and safety advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A sensor system for detecting a change in component composition of a liquid emulsion comprising:

a ring oscillator circuit including an odd number of inverting logic gates connected head to head in a continuous ring, said ring oscillator circuit further including a plurality of passive input probes which are in electrical communication with said continuous ring of head to head logic gates, said passive input probes being immersed within said liquid emulsion in a symmetrical array whereby said ring oscillator circuit generates an oscillating signal that circulates at a frequency which varies according to the dielectric properties of the liquid emulsion;

frequency conversion means in electric communication with said oscillator circuit for sensing said frequency of said oscillating signal, and linearly converting said frequency to a corresponding voltage signal;

comparing means in electrical communication with said frequency conversion means for comparing said output voltage signal to a predetermined voltage value, and for generating an output signal when said voltage signal exceeds said predetermined voltage value; and external signal means in electrical communication with said comparing means for providing an externally recognizable signal responsive to said output signal.

2. The sensor system of claim 1 wherein said external signal means comprises an audible signal.

3. The sensor system of claim 1 wherein said external signal means comprises a visual signal.

4. The sensor system of claim 2 wherein said external signal means further comprises a visual signal.

5. The sensor system of claim 1 wherein said frequency conversion means comprises a frequency divider circuit and a frequency to voltage conversion circuit.

6. The sensor system of claim 1 wherein said symmetrical array of passive probes are arranged around a common center.

7. The sensor system of claim 1 wherein said symmetrical array of passive probes comprises three probes arranged at the points of a triangular pattern.

8. A sensor system for detecting a change in percentage of water in an oil/water emulsion comprising:

a ring oscillator circuit including an odd number of inverting logic gates connected head to head in a continuous ring, said ring oscillator circuit further including a plurality of passive input probes which are in electrical communication with said continuous ring of head to head logic gates, said passive input probes being immersed within said oil/water emulsion in a symmetrical array whereby said ring oscillator circuit generates an oscillating signal that circulates at a frequency which varies according to the dielectric constant of the oil/water emulsion;

frequency conversion means in electric communication with said oscillator circuit for sensing said frequency and linearly converting said frequency to a corresponding voltage signal;

comparing means in electrical communication with said frequency conversion means for comparing said voltage signal to a predetermined voltage value, and for generating an output signal when said voltage signal exceeds said predetermined voltage value; and external signal means in electrical communication with said comparing means for providing an externally recognizable signal responsive to said output signal.

9. The sensor system of claim 8 wherein said external signal means comprises an audible signal.

10. The sensor system of claim 8 wherein said external signal means comprises a visual signal.

11. The sensor system of claim 9 wherein said external signal means further comprises a visual signal.

12. The sensor system of claim 8 wherein said frequency conversion means comprises a frequency divider circuit and a frequency to voltage conversion circuit.

13. The sensor system of claim 8 wherein said symmetrical array of passive probes are arranged around a common center.

14. The sensor system of claim 8 wherein said symmetrical array of passive probes comprises three probes arranged at the points of a triangular pattern.

* * * * *